United States Patent
Hesselink et al.

(10) Patent No.: US 10,033,743 B2
(45) Date of Patent: Jul. 24, 2018

(54) METHODS AND SYSTEMS FOR A PORTABLE DATA LOCKER

(71) Applicant: Western Digital Technologies, Inc., Irvine, CA (US)

(72) Inventors: Lambertus Hesselink, Atherton, CA (US); Rajesh K. Batra, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/843,122

(22) Filed: Sep. 2, 2015

(65) Prior Publication Data
US 2016/0065587 A1   Mar. 3, 2016

Related U.S. Application Data

(63) Continuation of application No. 12/916,342, filed on Oct. 29, 2010, now Pat. No. 9,129,138.

(51) Int. Cl.
*H04L 29/06* (2006.01)
*G06F 21/78* (2013.01)
(Continued)

(52) U.S. Cl.
CPC .......... *H04L 63/105* (2013.01); *G06F 21/62* (2013.01); *G06F 21/6209* (2013.01);
(Continued)

(58) Field of Classification Search
CPC ...... G06F 21/78; G06F 21/62; G06F 21/6209; G06F 21/6218; G06F 21/80; G06F 2221/0702
(Continued)

(56) References Cited

U.S. PATENT DOCUMENTS

| 5,649,185 A | 7/1997 | Antognini et al. |
| 6,549,490 B1 | 4/2003 | Howarth |

(Continued)

OTHER PUBLICATIONS

Alamri, "Authorization Control for a Semantic Data Repository through an Inference Policy Engine", Dec. 2013, IEEE, p. 328-340.*

(Continued)

*Primary Examiner* — Taghi Arani
*Assistant Examiner* — Gregory Lane
(74) *Attorney, Agent, or Firm* — Knobbe, Martens, Olson & Bear LLP

(57) ABSTRACT

The embodiments provide for binding files to an external drive, a secured external drive, or portable data locker. The files are bound in order to help restrict or to prevent access and modification by certain computers or users. Computers or users that are authorized or within the authorized domain are permitted full access. The files stored on the external drive may be bound in various ways. The files may be encapsulated in a wrapper that restricts the use and access to these files. The bound files may require execution of a specific application, plug-in, or extension. A computer may thus be required to execute program code that limits the use of the secured files. In one embodiment, the external drive provides the required program code to the computer. In other embodiments, the required program code may be downloaded from a network or provided by an external authority.

24 Claims, 10 Drawing Sheets

(51) Int. Cl.
*G06F 21/62* (2013.01)
*G06F 21/80* (2013.01)

(52) U.S. Cl.
CPC .......... *G06F 21/6218* (2013.01); *G06F 21/78* (2013.01); *G06F 21/80* (2013.01); *H04L 63/061* (2013.01); *G06F 2221/0704* (2013.01)

(58) Field of Classification Search
USPC .................................. 713/189, 193; 707/784
See application file for complete search history.

(56) References Cited

U.S. PATENT DOCUMENTS

| | | |
|---|---|---|
| 6,799,274 B1 | 9/2004 | Hamlin |
| 6,853,731 B1 | 2/2005 | Boyle et al. |
| 6,950,441 B1 | 9/2005 | Kaczmarczyk et al. |
| 6,978,348 B2 | 12/2005 | Belknap et al. |
| 7,027,716 B1 | 4/2006 | Boyle et al. |
| 7,106,947 B2 | 9/2006 | Boyle et al. |
| 7,178,036 B1 * | 2/2007 | Staring ............ G11B 20/00086 380/201 |
| 7,292,775 B1 | 11/2007 | Boyle et al. |
| 7,426,329 B2 | 9/2008 | Calhoon et al. |
| 7,444,388 B1 | 10/2008 | Svendsen |
| 7,487,312 B2 | 2/2009 | Paveza et al. |
| 7,499,938 B2 | 3/2009 | Collart |
| 7,577,677 B2 | 8/2009 | Collart |
| 7,587,446 B1 | 9/2009 | Onyon et al. |
| 7,653,761 B2 | 1/2010 | Juster et al. |
| 7,701,705 B1 | 4/2010 | Szeremeta |
| 7,730,132 B2 | 6/2010 | Ludwig et al. |
| 7,735,145 B2 | 6/2010 | Kuehnel et al. |
| 7,770,025 B2 | 8/2010 | Bobrow |
| 7,814,554 B1 | 10/2010 | Ragner |
| 8,064,194 B2 | 11/2011 | Szeremeta |
| 8,113,873 B1 | 2/2012 | Sarraf |
| 8,133,426 B1 | 3/2012 | Yurchenco et al. |
| 8,358,395 B1 | 1/2013 | Szeremeta |
| 8,417,979 B2 | 4/2013 | Maroney |
| 8,462,460 B1 | 6/2013 | Szeremeta et al. |
| 8,498,088 B1 | 7/2013 | Klein |
| 8,526,798 B2 | 9/2013 | Hesselink |
| 8,547,658 B1 | 10/2013 | Szeremeta |
| 9,129,138 B1 | 9/2015 | Hesselink et al. |
| 2001/0021926 A1 * | 9/2001 | Schneck ................. G06F 21/10 705/54 |
| 2001/0029583 A1 | 10/2001 | Palatov et al. |
| 2001/0042170 A1 | 11/2001 | Belknap et al. |
| 2001/0056541 A1 | 12/2001 | Matsuzaki et al. |
| 2002/0010863 A1 * | 1/2002 | Mankefors ............ G06F 21/125 713/189 |
| 2002/0104019 A1 | 8/2002 | Chatani et al. |
| 2002/0166035 A1 | 11/2002 | Belknap et al. |
| 2004/0199515 A1 * | 10/2004 | Penny .................. G06F 3/0607 |
| 2005/0044386 A1 * | 2/2005 | Libin ....................... H04L 9/00 713/185 |
| 2005/0120380 A1 | 6/2005 | Wolfe |
| 2005/0210101 A1 | 9/2005 | Janik |
| 2005/0210249 A1 | 9/2005 | Lee et al. |
| 2005/0281470 A1 | 12/2005 | Adams |
| 2006/0245725 A1 | 11/2006 | Lim |
| 2007/0055982 A1 | 3/2007 | Spilo |
| 2007/0056013 A1 | 3/2007 | Duncan |
| 2007/0174140 A1 | 7/2007 | Noonan et al. |
| 2007/0250193 A1 | 10/2007 | Raines et al. |
| 2008/0152305 A1 | 6/2008 | Ziegler |
| 2008/0199006 A1 | 8/2008 | Gandolph et al. |
| 2008/0249874 A1 | 10/2008 | Seo |
| 2008/0295174 A1 * | 11/2008 | Fahmy .................. G06F 21/554 726/23 |
| 2009/0094160 A1 | 4/2009 | Webster et al. |
| 2009/0169020 A1 | 7/2009 | Sakthikumar et al. |
| 2009/0249420 A1 | 10/2009 | Kim et al. |
| 2009/0282462 A1 | 11/2009 | Skaria et al. |
| 2010/0011351 A1 | 1/2010 | Tsvi et al. |
| 2010/0030867 A1 | 2/2010 | Yao |
| 2010/0146269 A1 | 6/2010 | Baskaran |
| 2010/0211802 A1 * | 8/2010 | Humphries ............. G06F 21/78 713/193 |
| 2010/0228989 A1 * | 9/2010 | Neystadt .................. G06F 21/10 713/185 |
| 2010/0318417 A1 | 12/2010 | Brisebois et al. |
| 2011/0150436 A1 | 6/2011 | Hesselink |
| 2012/0023139 A1 * | 1/2012 | Greeley .............. G06F 21/6218 707/784 |
| 2012/0036041 A1 | 2/2012 | Hesselink |

OTHER PUBLICATIONS

Wang, "Flash memory for ubiquitous Hardware Security Functions: True Random Number Generation and Device Fingerprints", 2012, IEEE, pp. 33-47.*
Roy, "Secure the Cloud: From the perspective of a Service-Oriented Organization", Feb. 2015, ACM Computing, p. 1-31.
"Technological Protection Systems for Digitized Copyrighted Works: A Report to Congress," TEACH Act Report by USPTO, May 20, 2003.
Quantum Data, Inc., "Designing CEC into your next HDMI Product", http://www.hdmi.org/pdf/whitepaper/DesigningCECintoYourNextHDMIProduct.pd- f.
Notice of Allowance dated May 8, 2015 from U.S. Appl. No. 12/916,342, 12 pages.
Office Action dated Mar. 10, 2015 from U.S. Appl. No. 12/916,342, 24 pages.
Office Action dated Aug. 12, 2014 from U.S. Appl. No. 12/916,342, 20 pages.
Office Action dated Jun. 7, 2013 from U.S. Appl. No. 12/916,342, 19 pages.
Office Action dated Aug. 31, 2012 from U.S. Appl. No. 12/916,342, 24 pages.
Interview Summary dated May 8, 2015 from U.S. Appl. No. 12/916,342, 1 pages.
Advisory Action dated Aug. 8, 2013 from U.S. Appl. No. 12/916,342, 2 pages.

* cited by examiner

METHODS AND SYSTEMS FOR A PORTABLE DATA LOCKER

This application is a continuation of U.S. patent application Ser. No. 12/916,342, filed on Oct. 29, 2010, which is hereby incorporated by reference in its entirety.

DESCRIPTION OF THE EMBODIMENTS

Background

In today's computing environment, businesses and enterprises struggle to control their business data and information. The hard drives on employees' computers often contain vast amounts of sensitive or confidential information. Unfortunately, the typical security measures provide weak protection at best for such data even when the computers or users are within a protected environment of a business. The challenges of protecting data is further heightened when employees are permitted to work from remote locations, such as their home, or use portable devices, such as laptop computers, smart phones, tablet computers, etc. Indeed, the proliferation of mobile computing devices has also made it more important than ever to provide ways to protect sensitive and confidential.

One known solution is to utilize a password-locked external hard drive. In order to access the drive, the user must enter a password on the drive itself or via a software application. However, this solution is only as strong as the password utilized. In addition, the storage medium from the hard drive can still be removed or copied to circumvent this solution.

Another known solution is to utilize disk encryption or file system encryption. Unfortunately, encryption-based solutions can be processor intensive, time consuming, or inconvenient for the user. For example, a user may have to select on a file-by-file basis the various files to encrypt.

Accordingly, it would be desirable to provide a way for businesses and enterprises to control their information while allowing convenient access in a variety of applications.

SUMMARY

In an embodiment, a method of binding a file to an external drive is provided. A file is saved to an external drive, wherein the file is bound to the external drive to restrict the file from being modified or moved to another storage location in an unauthorized manner. When the external drive has been coupled to a second computer, access by the second computer to the file is restricted based on program code executing on the second computer that restricts the second computer from copying and saving at least a portion of the file to a location other than the external drive.

In accordance with another embodiment, an external drive is configured to limit access and use of a file from a first computing device when the external drive is coupled to another computing device. The external drive comprises: a storage medium for storing at least one file written from the first computing device; a communications interface; and a processor. The processor is configured by instructions to identify when a device that is not the first computing device has been coupled to the communications interface and to require the other device to execute program code that restricts the other computer from copying and saving at least a portion of the file to a location other than the storage medium.

In accordance with another embodiment, a computing device is configured with restricted access to a file from another computing device that has been stored on an external drive. The computing device comprises a communications interface capable of being coupled to the external drive; a client application executing on the computing device that is capable of accessing the file from the external drive; and a processor configured by program code that is required by the external drive. The processor is configured to restrict the client application from copying and saving at least a portion of the file to a location other than the external drive.

Additional features of the embodiments will be set forth in part in the description which follows, and in part will be obvious from the description, or may be learned by practice of the embodiments. The advantages of the embodiments can be realized and attained by means of the elements and combinations particularly pointed out in the appended claims. It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the invention and together with the description, serve to explain the principles of the embodiments. In the Figures.

DESCRIPTION OF THE EMBODIMENTS

Figure 1:
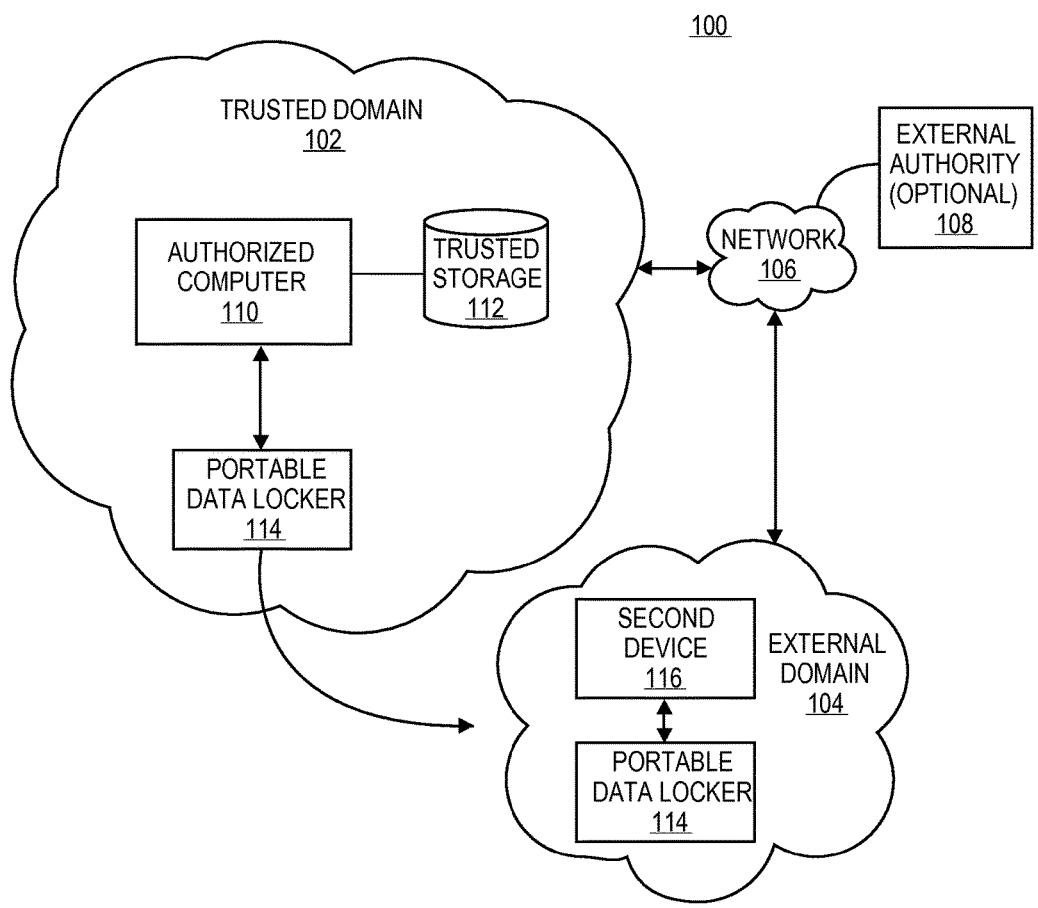
FIG. 1 shows a block diagram of an exemplary system that is consistent with the present disclosure.

The embodiments provide systems and methods for binding files to an external drive. The external drive may be a secured external drive or portable data locker. The files are bound to the external drive to help to restrict or to prevent access by certain computers or users. Users or computers that are authorized or within an authorized domain are permitted full access to the bound files for editing, copying, printing, etc. Various uses and applications of the external drive may be apparent to those skilled in the art.

For example, an employee may initially save and bind files to the external drive while at work on an approved network. Once bound to the external drive, the employee may then take the external drive and work on the files, for example, while at home or traveling. The external drive is configured to protect the files and prevent the employee from copying the files to an unauthorized storage location or to an unauthorized computer, while still allowing him to modify the files The embodiments may also allow an enterprise or business to collaborate with other organizations. For example, employees from one organization may save various files to an external drive, such as drawings, documents, etc., that may need to be shared, but contain sensitive or confidential information. The external drive may then be provided to another organization, allowing relevant parties to access or modify the files bound to the external drive while helping to ensure the files are returned with the external drive. In accordance with the embodiments, the files remain protected and their dissemination can be controlled. In this instance, files may optionally be prohibited from being edited.

As yet another example, in the embodiments, the files bound to the external drive may be secured based on the user's identity or role as well as the device or computer being used to access the external drive. Hence, users from one department, such as engineering, may be restricted in accessing files from another department, such as marketing or finance, that are bound to the external drive. Therefore, the external drive can serve as a secured storage location or archive for files and provide various levels of security.

Accordingly, the restrictions and access controls enforced for files bound to the external drive of the embodiments can apply to devices, computers, or users, alone or in combination. Authentication and authorization, including the ability to make changes to the file may be determined at a variety of levels in the embodiments.

The files stored on the external drive may be bound to the drive in various ways. For example, the files may be encapsulated in a wrapper that restricts the use and access to these files when accessed by certain computers or users, or require execution of a plug-in. In order to access the files bound to an external drive, the computer is thus required to execute program code that limits the use of the secured files. In one embodiment, the external drive provides the program code to the computer so that it may access the secured files. In other embodiments, the program code for accessing the bound files may be downloaded from a network or provided by an external authority.

Accordingly, among other things, the embodiments allow for expanded or more flexible secured or restricted use of files by an organization. For example, an employee of a company may need or desire to work on a file while traveling or while working from home. However, the contents of the file may be sensitive or proprietary to the company. The embodiments allow the file to be bound to a device, i.e., an external drive, and the contents of the file to be protected when accessed in an otherwise unsecure environment. These and other use-cases for binding files to an external drive are consistent with the present disclosure.

Various embodiments of the present disclosure will now be described with reference to the accompanying figures, wherein like numerals may refer to like elements throughout. FIG. 1 shows a block diagram of an exemplary system 100 that is consistent with the present disclosure. As shown, the system 100 may comprise a trusted domain 102, a domain 104 that is external to the trusted domain 102, a network 106, and (optionally) an external authority 108. These components of system 100 will now be further described.

Figure 2:
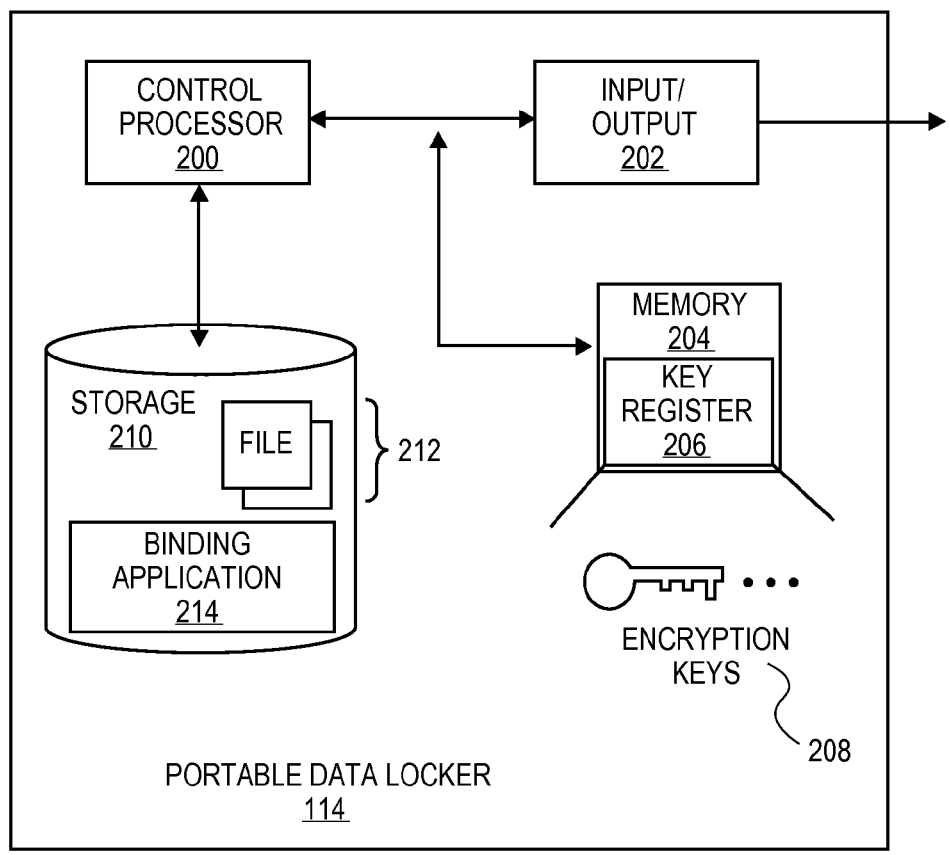
FIG. 2 shows a block diagram of an exemplary external drive that is implemented as a portable data locker device in accordance with an embodiment of the present disclosure.

Trusted domain 102 conceptually refers to a collection of one or more devices, such as an authorized computer 110, which have read, write, and edit access to a set of files, such as file 212 (as shown in FIG. 2). For example, the trusted domain 102 may represent the network and computer systems of a business or enterprise. Trusted domain 102 may also have various trust relationships with other domains that are one-way or two-way. For example, users of trusted domain 102 may have access to other domains, but the trusted domain 102 may not allow access by external users. As another example, the trusted domain 102 may have two-way trust with another domain (not shown) that it trusts, and thus, users of both domains may access each other's domain.

As shown, trusted domain 102 may comprise an authorized computer 110 that is coupled to a trusted storage 112. The authorized computer 110 represents any computing device that may be used by a user or employee within the trusted domain 102. For example, the authorized computer 110 may be a personal computer, a server, a laptop computer, a smart phone, a tablet computer, and the like. Any type of computing device that is capable of creating, modifying, and accessing a file may be considered an authorized computer 110 or part of the trusted domain 102.

In typical operation, a user may use authorized computer 110 to create various files and documents using well-known applications, such as word processors, spreadsheets, presentation software like those provided by Microsoft Office, and the like. Such files may then be stored on trusted storage 112. In the embodiments, the files may be stored in encrypted or unencrypted form depending on the desires of the user or the business rules and policies of the trusted domain 102.

Trusted storage 112 refers to the storage coupled to the authorized computer 110 or any storage residing within the trusted domain 102. For example, the trusted storage 112 may be the hard disk drive of the authorized computer 110. Alternatively, the trusted storage 112 may be a remote storage, such as one or more network attached storage devices or servers, that are coupled to the authorized computer 110 within the trusted domain 102.

Portable data locker (PDL) 114 serves as a device that can be taken outside of the trusted domain 102 yet still provides a way to restrict access to files from the trusted domain 102. In particular, files created within the trusted domain 102 may be saved, copied, or written to the PDL 114. The PDL 114 is configured to bind these files in such a manner that the files are restricted from being accessed or edited by another device (such as second device 116) or moved to another storage location if outside of trusted domain 102. These and other features of the PDL 114 may thus allow a user or employee to take the PDL 114 to another location and access various files in an acceptable or secure manner when outside of the trusted domain 102.

In the embodiments, the PDL 114 is implemented based on a portable external hard disk drive, such as those made by Western Digital Technologies, Inc. In addition, the PDL may be implemented as a portable solid-state memory device, portable hybrid solid state/hard disk drive, optical drives, and/or the like.

As to external domain 104, this domain refers to any device or collection of devices that are un-trusted or not part of the trusted domain 102. For example, the external domain 104 may refer to a computer used in public, a user's home computer, and/or the like.

Second device 116 represents a computing device that is part of domain 104, i.e., external or not trusted by the trusted domain 102. For example, the second device 116 may be a personal computer, a server, a laptop computer, a smart phone, a tablet computer, and the like. Any type of computing device that is capable of creating, modifying, and accessing a file may be used as the second device 116. In addition, the second device 116 may utilize various software applications to access a file, such as word processors, spreadsheets, presentation software like those provided by Microsoft Office, and the like.

As also shown, the PDL 114 may be taken outside of the trusted domain 102 and coupled to another device, such as the second device 116. However, as will be explained further below, the various files may be bound to the PDL 114 and access to these files by the second device 116 may be restricted in various ways. For example, the second device 116 may be allowed to modify a file, but only allowed to store or copy the file or portions of the file to the PDL 114.

Network 106 represents the communication infrastructure for system 100. For example, network 106 may comprise various local area and wide area networks. In addition, network 106 can comprise both voice and data networks known by those skilled in the art. In some embodiments, network 106 comprises the Internet. Of course, network 106 may represent other networks that couple the components of system 100.

External authority 108 is an optional component of the system 100 to assist the PDL 114 in controlling access to various files. For example, external authority 108 may serve as a third-party authentication and authorization service for the system 100. In some embodiments, the external authority 108 may provide the various software and program code needed by the second device 116 to access files on the PDL 114. In addition, the external authority 108 may provide other information, such as meta-data and policy files, used by the second device 116 when accessing files on the PDL 114. For example, the external authority 108 may specify when access to various files on the PDL 114 is revoked or specify a limited number of devices that can be mated or coupled to the PDL 114. In addition, the external authority 108 may provide various key management services, such as public key infrastructure services, to the second device 116 when accessing files on the PDL 114.

External authority 108 may be implemented using one or more servers, such as an access control server, a certificate authority, and the like. Such components are known to those skilled in the art. For example, the external authority 108 may implement the Kerberos protocol to assist the second device 116 when accessing files on the PDL 114.

In some embodiments, the external authority 108 may also provide an update service to specify when access to the files on the PDL 114 has been modified or revoked. Modification or revocation can be initiated based on a time interval or based on the occurrence of certain events, such as after a threshold number of accesses, or when a breach has been detected. For example, the external authority 108 may periodically or continuously provide revocation updates via the network 106. In some embodiments, as part of its operations or start-up sequence, the PDL 114 may retrieve or be required to receive this information from the external authority 108. This update information may be provided in various formats, such as a set of permissions, a set of restrictions, key protocols, key rotation algorithms, digital signatures, etc. The update information may also be encrypted or otherwise secured in order to protect the information during transmission from the external authority 108. As another example, the external authority 108 may send policy updates or revocations upon the detection of a breach or other event at PDL 114. This update or revocation may comprise information to patch or remedy the cause of the breach. Thus, the update service of the external authority 108 allows the PDL 114 to dynamically implement its binding and overcome various hacking or intrusion efforts by third parties when they may occur.

In some embodiments, the external authority 108 is also configured to request or receive logging information from the PDL 114. The PDL 114 may provide log information on a continuous or periodic basis. Alternatively, the PDL 114 may be configured to upload its log information to the external authority 108 upon the occurrence of certain events, such as when a breach has been detected or when an error has occurred on the PDL 114. The external authority 108 may then perform various analyses of the log information. For example, if desired, the external authority 108 may provide a trace service to locate one or more users suspected of breaching the security of the PDL 114 or attempting various unauthorized operations on files bound to the PDL 114.

Alternatively, the PDL 114 may provide to the second device 116 the program code, meta-data, policy information, etc. For example, upon start-up, the PDL 114 may be configured to install program code or software on the second device 116 before allowing any access to its storage medium. As another example, the PDL 114 may be configured to interrogate or challenge the second device 116 to present one or more credentials before it allows access to any files stored on its storage medium. For example, the PDL 114 may include a partition that represents itself as a Virtual CD which may include an auto-run feature. As another example, the PDL 114 may utilize an auto-run or auto-play feature, such as those provided by the Microsoft Windows™ operating system, that initiates installation of a driver and/or program code for the PDL 114 on to the second device 116.

FIG. 2 shows a block diagram of an exemplary external drive that is implemented as a portable data locker (PDL) 114 in accordance with an embodiment of the present disclosure. As shown, the PDL 114 may comprise a control processor 200, an input/output 202, a memory 204 having a key register 206 and storing one or more encryption keys 208, a storage medium 210, a file 212 that is to be protected by the PDL 114, and a binding application 214. These components will now be further described.

Control processor 200 represents the logic and circuitry that carries out the storage control functions of personal archive device 106. For example, control processor 200 may be general purpose CPU, such as those made by Intel Corporation. Alternatively, control processor 200 may be implemented using other forms of processors and circuitry. For example, control processor 200 may be implemented based on a field-programmable gate array (FPGA) or application specific integrated circuit (ASIC).

In some embodiments, control processor 200 may also comprise encryption hardware for encrypting and decrypting contents stored on the PDL 114. The encryption hardware may be integrated as a component of the control processor 200 or may be implemented as a companion device, such as a co-processor, that is coupled to the control processor 200. In some embodiments, the PDL 114 is configured to support various encryption standards, such as Advanced Encryption Standard (AES).

Input/output 202 serves as the communications interface for personal archive device. For example, input/output 202 may comprise interfaces, such as SCSI, USB, IEEE 1394, Firewire, eSATA, HDMI, and the like to allow the PDL 114 to connect to other devices, such as authorized computer 110 or second device 116.

Memory 204 serves as a temporary storage memory for the PDL 114. For example, memory 204 may serve as the storage for instructions being executed by control processor 200. Memory 204 may be implemented using various types of memory both volatile and non-volatile. For example, memory 204 may be implemented using RAM, DDR RAM, SDRAM, DRAM, ROM, PROM, EPROM, EEPROM, flash memory, etc.

Key register 206 serves as a temporary storage for the various keys, such as encryption keys 208 used in the embodiments. Control processor 200 may thus use key register 206 for its key management requirements. In some embodiments, the key register 206 is located such that it is generally inaccessible to a user, such as within a hidden portion of the memory 204 and/or a hidden sector of the storage medium 210.

Key register 206 may store various types of keys, including identity keys to authenticate the identity of the PDL 114 or a user of the PDL 114, keys used to encrypt sensitive data, such as key material, passwords, etc., and binding keys used to bind one or more files, such as file 212, to the PDL 114.

Storage medium 210 is a storage medium and is configured as a controlled environment in which various files are bound to the PDL 114. For example, the PDL 114 may bind a file based on some unique feature, such as a serial number from memory 204, MAC addresses, etc. of the PDL 114. For example, a file may be locked to the PDL 114 based on a fingerprinting of storage medium 210. The fingerprinting may be accomplished through spectral signatures of storage medium 210 or through drive defect signatures. For example, content locking features are described in U.S. Pat. No. 6,799,274 entitled "Device Comprising Encryption Circuitry Enabled by Comparing an Operating Spectral Signature to an Initial Spectral Signature," to Hamlin, which is herein incorporated by reference in its entirety. In various embodiments, the storage medium 210 may be implemented as one or more hard disk drives, such as those made by Western Digital Technologies, solid state devices, hybrid solid state/hard disk drives, and/or the like.

File 212 represents any file to which a user may desire access. Such files and file types are well known to those skilled in the art. When stored on the PDL 114, the file 212 may be stored in encrypted or unencrypted form. In some embodiments, the file 212 is stored based on a standard file type, such as .txt, .doc, .ppt, .xls, etc. In other embodiments, the file 212 is wrapped or encapsulated in a wrapper that requires a specific software application or driver to open.

In some embodiments, a binding application 214 may be installed on the PDL 114. Binding application 214 is an application installed on the PDL 114 that binds the file 212 to the PDL 114 and cooperates with the second device 116 to control or restrict access to the file 212. Binding application 214 may be implemented via instructions executed by control processor 200. For example, the PDL 114 may execute the binding application 214 to strengthen or make the binding of file 212 more restrictive. The binding application 214 may also be utilized in instances where the second device 116 has limited processing resources or limited applications, such as a mobile device, a tablet computer, a smart phone, etc. Alternatively, in some embodiments, the binding application 214 is integrated into the program code installed on the second device 116 or the functions of the binding application 214 are performed by an application running on the second device 116. In some embodiments, the binding application 214 is configured to avoid external analysis or intrusion. For example, the binding application 214 may utilize rotating keys or self-expiring code that deletes itself after each use or after a certain period of time. The binding application 214 may also employ encrypted or other secure communications with other applications or devices to avoid, for example, protocol analysis. As noted above, the binding application 214 may also be configured to implement a plurality of encryption functions and protocols that are dynamically selected. Thus, the behavior of the binding application 214 can be adapted depending upon the detected environment or upon detection of a security breach or intrusion. In some embodiments, this dynamic behavior is managed by the PDL 114 to make the user experience relatively transparent.

When coupled to a device, the binding application 214 determines whether the PDL 114 is within a trusted environment, such as trusted domain 102, and then selectively provides access to the file 212 accordingly. If the binding application 214 determines that it is not within the trusted domain 102 and instead within an untrusted or unknown location, such as external domain 104, then the binding application 214 will require the device 116 to attest to its suitability for access to the file 212. For example, the binding application 214 may require the presence of various security measures, such as file system permissions, plug-ins, applications, and application extension, on the second device 116. The binding application 214 may also verify various aspects of the second device 116, such as its hardware components, firmware, operating system, and software licensing.

Alternatively, the binding application 214 may be a special purpose application that is specific to the PDL 114, but utilizes existing applications, such as word processors, spreadsheets, browsers, etc. in an embedded fashion. For example, the manufacture or authorized vendor of the PDL 114 may provide the special purpose application on the PDL 114 itself, via an associated medium, such as an optical disc, or via a download, such as from a website. Hence, in these embodiments, the binding application 214 provides a secure version or secure framework of an application to protect the binding of the files. In these embodiments, such versions of the binding application 214 may be executed based on a special file extension or wrapper that is generated when a file is bound to the PDL 114.

The binding application 214 may perform auditing and logging functions to record operations attempted and performed on the PDL 114. For example, the binding application 214 may transparently record information, such as date and time of access, information about the second device 116, the application requesting access to the file 212, etc. In some embodiments, this audit and logging information is secured and/or encrypted to prevent tampering. In addition, the audit and logging information may be transferred or otherwise sent to another location, such as the external authority 108, for services like analysis or monitoring. This transfer may occur based on a periodic schedule or based on an event, such as detection of a security breach or upon reaching a threshold condition like age, number of operations, etc.

Furthermore, upon detecting an improper access or unauthorized tampering of the PDL 114, the binding application 214 may be configured to perform various alerting and security actions. For example, the binding application 214 may display a warning message to be displayed on the PDL 114 or on the second device 116. The binding application 214 may also be configured to send a warning message or alarm to a specified destination, such as external authority 108 or authorized computer 110. The message may be routed through the network 106 in various forms, such as an email, a HTTP message, a text message, etc. In addition, if desired or necessary, the binding application 214 may be configured to render the contents of the PDL 114 unreadable or inaccessible. For example, the binding application 214 may delete the contents of the key register 206 or overwrite the contents of its storage 210.

Figure 3:
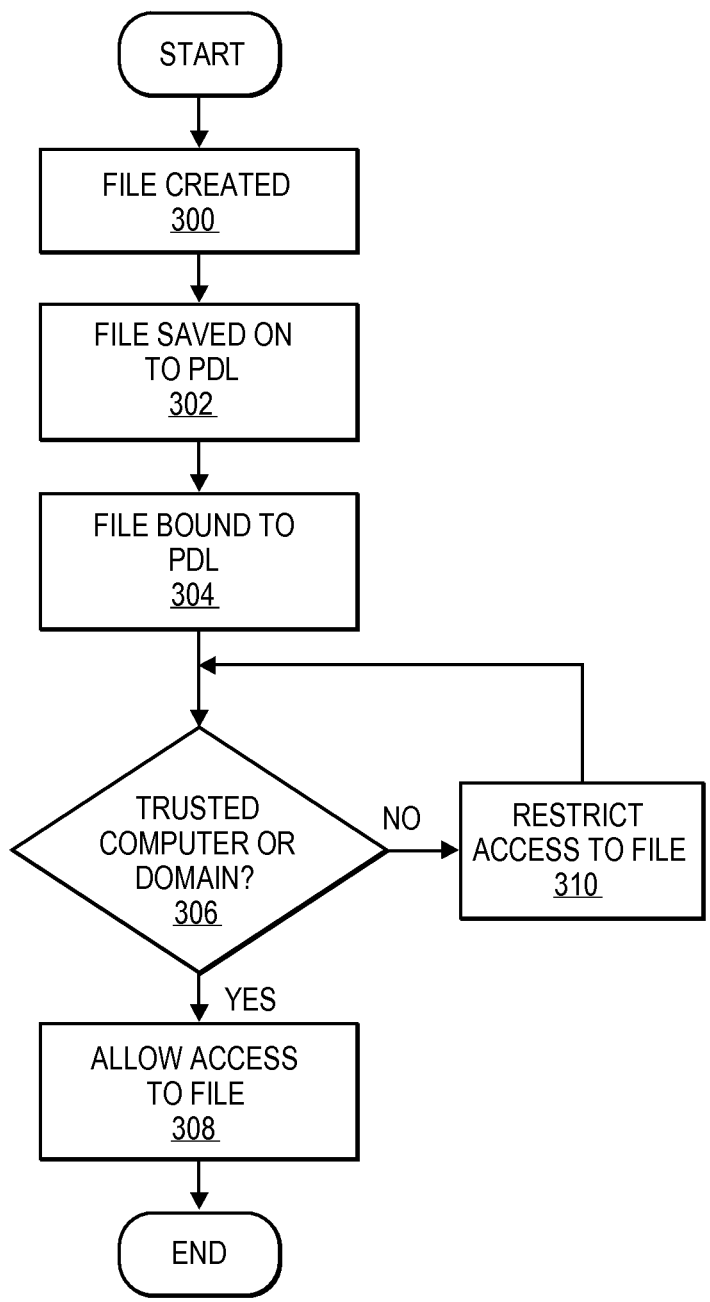
FIG. 3 shows an exemplary process flow for controlling access to a file in accordance with an embodiment of the present disclosure.

FIG. 3 shows an exemplary process flow for controlling access to a file in accordance with an embodiment of the present disclosure. In stage 300, a file 212 is created. For example, a user of authorized computer 110 may use an application, such as a word processor, a spreadsheet, etc. to create the file 212. Optionally, the user then may store the file 212 in trusted storage 112. The file 212 may also originate from another computer within the trusted domain 102 or may be a file that has been previously stored in trusted storage 112.

As noted, controlling access to a file bound to the PDL 114 may be desirable in a number of situations. For example, the embodiments can enable files bound to the PDL 114 to be accessed and allowed to be optionally modified in different locations, such as an employee working at home or while on travel. The embodiments also enable files to be securely shared and restricted between organizations, such as companies working together on a project and wishing to share certain sensitive information. As yet another example, the embodiments allow for authentication and authorization for access and or modification to files on the PDL 114 at a variety of levels alone or in combination. In particular, the authentication and authorization to files on the PDL 114 may be based on the identity or role of a user as well as the characteristics and location of computer or device. Reference will now be made to FIG. 3 to illustrate an exemplary process flow of the embodiments.

In stage 302, the file is saved or written to the PDL 114. For example, the user may connect the PDL 114 to the authorized computer 110, such as via a USB connection. The PDL 114 may then authenticate the authorized computer 110. For example, the PDL 114 may check for unique characteristics of the authorized computer 110, such as a serial number, a MAC address, an IP address within a given domain/range, etc. The PDL 114 may also utilize other authentication schemes, such as a mutual authentication using symmetric keys, public key cryptography, digital certificates, etc. Alternatively, the PDL 114 may check the authorized computer 110 to determine if a specific set of program code, such as a driver, application plug-in, etc. is installed on the authorized computer 110. Moreover, the PDL 114 may implement drive locker technology that specifies a certain number of devices that can be mated or coupled to the PDL 114.

In stage 304, the file 212 is bound to the PDL 114. In some embodiments, the binding of the file 212 to the PDL 114 is performed as a required or transparent part of saving or writing the file to the PDL 114. For example, when saving the file 212, the user may be presented the option of binding the file 212. Furthermore, the user may specify various security measures, such as a PIN or password that will be required to access the file 212 when it is stored on the PDL 114. As another example, the binding of the file 212 to the PDL 114 may be performed based on saving the file 212 as a special file type or within a wrapper. Accordingly, this stage may be performed automatically without the need for user intervention.

Alternatively, the binding of the file 212 may be performed with some user interaction, such as a request for a confirmation, entry of a password, etc. Furthermore, the binding of the file 212 may be restricted to various extents. For example, the file 212 may be bound to the PDL 114 based on various file system permissions and/or access control lists specifying read, write, and modify permissions at the drive, volume, directory, or file level on the PDL 114. The file 212 may also be bound to the PDL 114 such that only certain hardware, applications or operating systems are able to access the file 212. For example, the binding of the file 212 may limit access to a specific operating system or a specific type of device, such as server or a personal computer.

The file 212 may be bound to the PDL 114 in various ways. For example, the binding application 214 may encrypt one or more portions of the file 212 using one or more keys from the key register 206. In other embodiments, the file 212 may be bound to the PDL 114 based on restricting or preventing various operations with program code that will be installed on the second device 116. Examples of such program code are also illustrated with reference to FIGS. 4A-4C. In yet other embodiments, the binding application 214 may wrap the file 212 in a wrapper that requires another device, such as second device 116, to execute a specific software application that is recognized by the PDL 114 and limits the access to the file 212. Accordingly, in the embodiments, the file 212 may be bound to the PDL 114 with or without the use of encryption. This feature allows the file 212 to be bound to various extents to the PDL 114. For example, files having highly sensitive content may be bound to the PDL 114 using a combination of encrypted and unencrypted binding techniques. In contrast, files having less sensitive content may be bound to the PDL 114 using simpler or less extensive binding techniques, such as file system permissions implemented by the PDL 114 or configured into the second device 116.

In some embodiments, the binding of the file 212 may also specify other policy features. For example, the binding of the file 212 may be configured with a specific expiration date, a revocation, or required renewal date. In some embodiments, when accessed, the PDL 114 may be configured to access a device in the trusted domain 102 and/or the external authority for policy information regarding the binding of the file 212. For example, upon start up, the PDL 114 may be configured to request an update for its bindings from the external authority 108. In response, the PDL 114 may receive updates for a wide variety of aspects of the policy, such as changes to the policy, revocation of various users, permissions or computers, notification of a possible breach or intrusion on another PDL. The PDL 114 may implement these changes or updates immediately and request confirmation from the computer or user. Alternatively, if necessary or desired, the PDL 114 may perform various operations to render the file unreadable, such writing over various sectors, deleting various keys, and the like. In some embodiments, the PDL 114 may implement a recovery mechanism. However, the recovery may require special privileges or additional measures, such as administrative rights or authorization from an external source, such as external authority 108.

In stage 306, the PDL 114 is coupled to another computing device, such as authorized computer 110 or second device 116. The PDL 114 then determines if it is coupled to the authorized computer 110, within a trusted domain 102, or outside of trusted domain 102, e.g., external domain 104. For example, the binding application 214 may query the authorized computer 110 for a credential, such as an encryption key, a digital certificate, a digital signature, password, etc. As another example, the binding application 214 may check with the external authority 108 to determine if the PDL 114 is still within the trusted domain 102. If within an authorized or trusted environment, processing flows to stage 308.

In stage 308, the PDL 114 has determined that it is coupled to the authorized computer 110 or within trusted domain 102 and then permits access to the file 212. In some embodiments, since the PDL 114 is within the trusted domain 102, the PDL 114 may generally allow unrestricted or relatively unrestricted access to the file 212. For example, the PDL 114 may allow the file 212 to be modified, copied, and saved to another location, such as trusted storage 112.

If the PDL 114 recognizes that it is coupled to a new device, such as second device 116, or in an external domain 104, then processing flows to stage 310. In some embodiments, the PDL 114 detects when it has been coupled to another device and may be configured as an auto-play or auto-run device. For example, the PDL 114 may be configured to mount itself on to the second device 116 such that it is interpreted as a CD-ROM drive. In some embodiments, the PDL 114 may require the user to authenticate their identity, such as with a PIN or a password. The user may enter this authentication information via the second device 116 or (if configured) directly on to the PDL 114. In yet other embodiments, the PDL 114 may be provided a dedicated application that runs from the PDL 114 for the user to enter authentication information.

In stage 310, the PDL 114 permits access to the file 212, but may restrict various uses and operations to ensure that file 212 remains protected. For example, the binding application 214 may automatically install program code, such as an application, an application plug-in, and the like that restricts or prevents write operations to the local hard disk of the second device 116. For example, as noted above, the PDL 114 may include a partition that represents itself as a virtual CD (VCD), which may include an auto-run feature. Alternatively, the PDL 114 may utilize an auto-run or auto-play feature, such as those provided by the operating system of the second device 116 that automatically initiates installation of a driver and/or program code for the PDL 114 on to the second device 116.

The program code may also prevent or restrict write operations to a storage device, such as a USB device, that has been coupled to the second device 116. As another example, the PDL 114 may check for a specific application or program code that has been previously installed on the second device 116 before allowing access to the file 212. The program code may also implement operating system level features, such as file system permissions and access control lists. The program code may thus protect the PDL 114 and the file 212 at a drive level, volume level, directory level, or file level. The program code may also protect itself from tampering or analysis by using self-deleting or self-expiring code. That is, the program code may be configured to delete or uninstall itself at various times, such as after each use or after a threshold number of uses. The program code may also employ features, such as expiring sessions keys or rotating keys, to avoid tampering or analysis.

In the embodiments, the second device 116 may be restricted in various ways. For example, the second device 116 may be restricted from copying or saving portions of the file 212 to a location other than the PDL 114. Upon confirmation of the appropriate program code being installed on the second device 116, or confirmation by the binding application 214, the second device 116 is permitted access to the file 212 bound to the PDL 114. For example, a user of the second device 116 may be shown a display, a listing, a pop-up window, etc., indicating that the file 212 may now be opened on the second device 116.

Applications running on the second device 116 may be restricted in their operations. For example, operation that may be restricted or prevented may include edit, copy, save, save as, new, printing, rename, open with, etc. Access to other applications, such as the clipboard application, text editor, terminal emulation, etc., may also be restricted to prevent unauthorized operations and protect the binding of the files to the PDL 114. In addition, the applications running on the second device 116 may be restricted or prevented from saving to a location other than the PDL 114. For example, the operations of applications running on the second device 116 may be monitored by program code installed on the second device 116, such as a plug-in, a kernel filter, etc. As noted, certain commands or operations, such as write operations, copy commands, save commands, etc. may be intercepted and evaluated to determine if they are allowed. If the command or operation is allowed, then the second device 116 executes the command or operation. If the command or operation is not allowed or considered to jeopardize the binding of the file 212, the user may also be provided a warning message, such as via a pop-window. The restriction of the operation or the command is then permitted depending, for example, on the policy or business rules associated with the file 212 and the binding of the file 212 to the PDL 114.

Figure 4A:
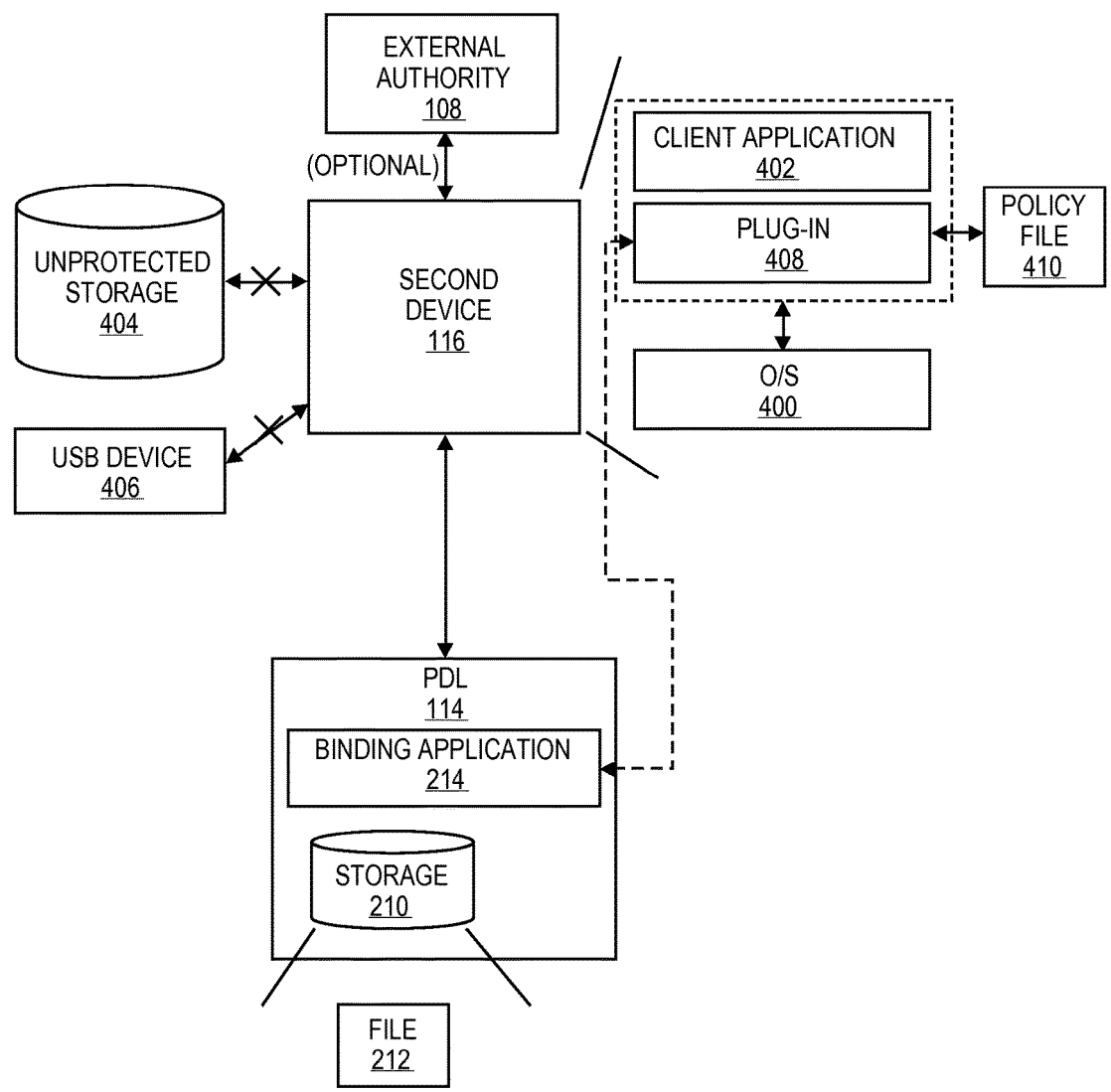
FIGS. 4A-4C show exemplary block diagrams of a computing device accessing a file that has been bound to a personal data locker in accordance with embodiments of the present disclosure.
Figure 4B:
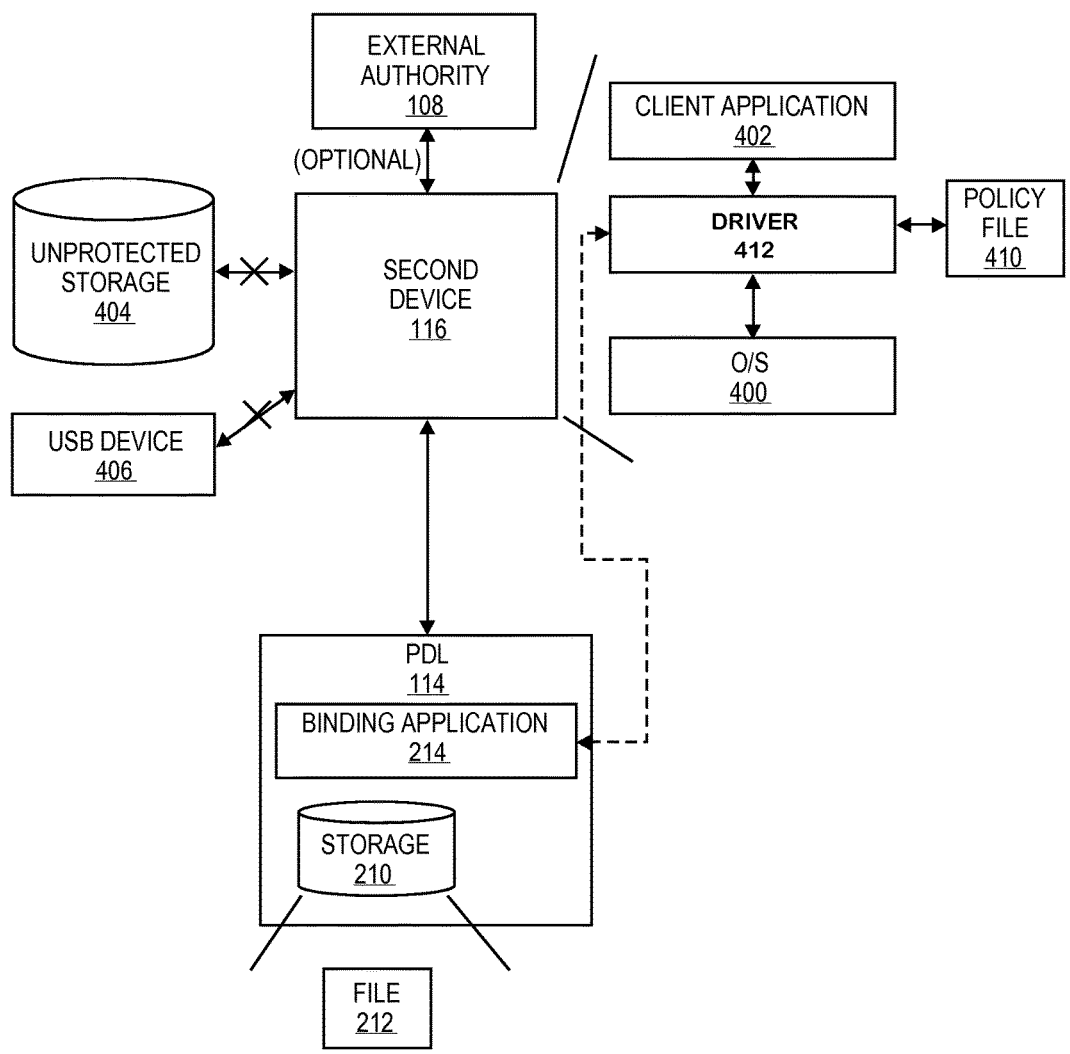
Figure 4C:
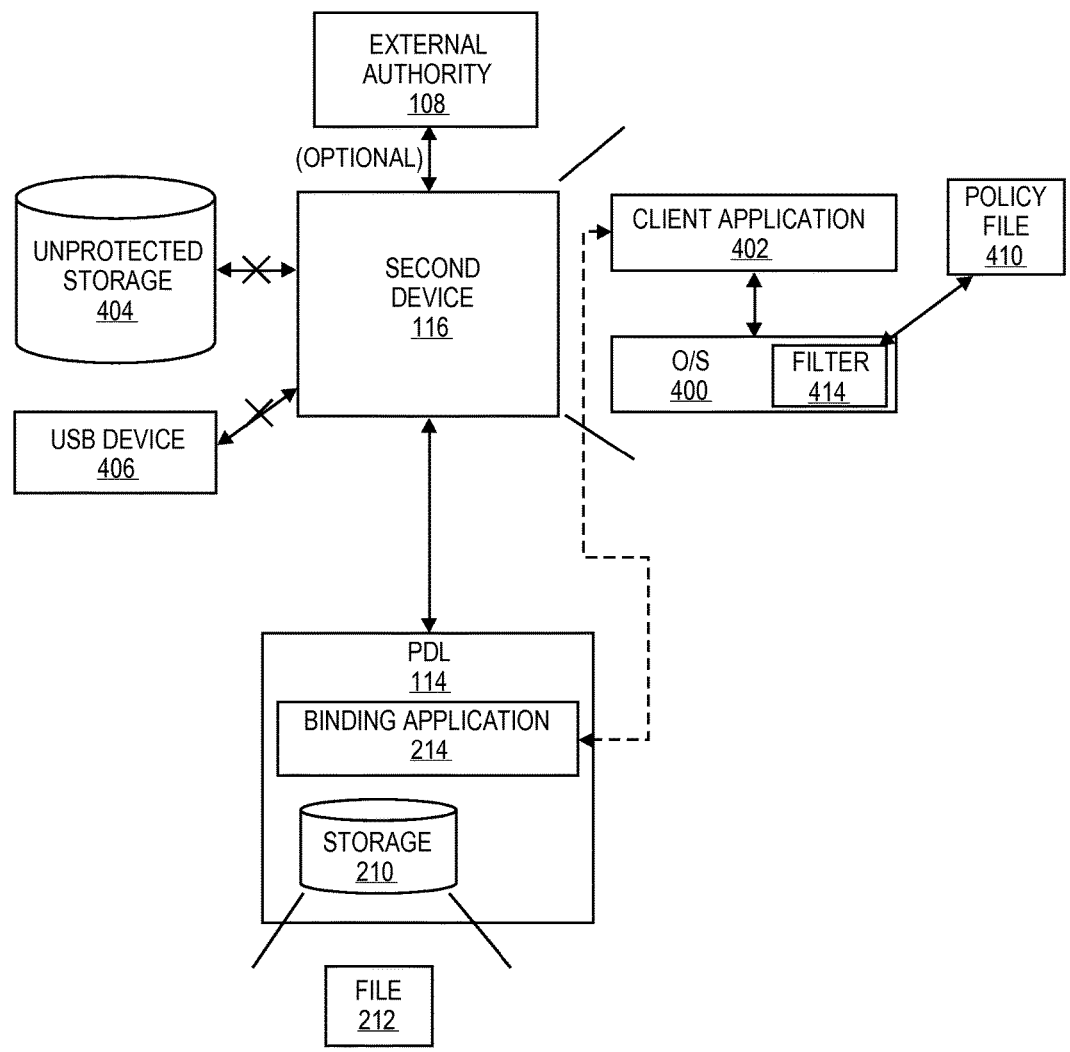

FIGS. 4A-4C show exemplary block diagrams of a computing device accessing a file that has been bound to a personal data locker in accordance with embodiments of the present disclosure. The second device 116 may be running an operating system (O/S) 400 and a client application 402 that a user may use to access a file. As shown in FIGS. 4A-4C, the second device 116, such as a laptop computer, smart phone, tablet computer, and the like, may be coupled to the PDL 114 via a wired or wireless connection. For example, the second device 116 may be coupled to the PDL 114 via a USB, Firewire, or SATA connection or a wireless protocol, such as, for example, BlueTooth®. The second device 116 may also comprise a storage 404, which is unprotected, and other memory or storage devices, such as a USB drive 406.

Referring now to FIG. 4A, the client application 402, such as a word processor, spreadsheet, etc., has been modified based on a plug-in 408. The plug-in 408 restricts or prevents various operations of the client application 402. As noted, operations of the client application 402 that may be restricted or prevented may include edit, copy, save, save as, new, printing, rename, open with, etc. In addition, in this embodiment, the applications running on the second device 116 are restricted or prevented from saving to a location other than the PDL 114. Moreover, as shown in FIG. 4B, the second device 116 may be restricted from certain operations with its storage 404 and another storage device, such as USB drive 406.

The plug-in 408 may be provided to the second device 116 from the PDL 114 by the binding application 214. For example, upon start up or being connected to the second device 116, the PDL 114 may automatically install the plug-in 408 in to the second device 116. Alternatively, the second device 116 may obtain the plug-in from another location or device, such as external authority 108 or a server connected to network 106 (not shown in FIG. 4A). For example, upon being connected to the PDL 114, the second device 116 may be redirected with or without user interaction to external authority 108 or a website to obtain the plug-in 408.

As also shown, the plug-in 408 may implement a set of policies or business rules. For example, the plug-in 408 may modify client applications 402 running on the second device 116 to prevent them from allowing operations, such as "Save as", "Rename", "Print", etc. The plug-in 408 may implement these modifications by removing or making un-selectable various menu items, such as those commonly provided in applications like Microsoft Word, Excel, Powerpoint, etc.

Such policies or business rules may be specified in a policy file 410. The policy file may be provided to the second device 116 from the PDL 114 by the binding application 214. Alternatively, the second device 116 may obtain the policy file 410 from another location or device, such as external authority 108 or a server connected to network 106 (not shown in FIG. 4A). Of note, the policies specified in policy file 410 may also be revoked or otherwise modified based on various criteria, such as number of devices, time, date, and the like.

Referring now to FIG. 4B, the second device 116 may be restricted in accessing the file 212 on the PDL 114 based on the driver software executed by the second device 116. As shown, the client application 402, such as a word processor, spreadsheet, etc., works in conjunction with a driver 412 that is specific or unique to the PDL 114. The driver 412 restricts or prevents various operations of the client application 402. As noted, operations of the client application 402 that may be restricted or prevented may include edit, copy, save, save as, new, printing, rename, open with, etc. In addition, the applications running on the second device 116 are restricted or prevented from saving to a location other than the PDL 114 by the driver 412. Moreover, as shown in FIG. 4B, the second device 116 may be restricted from certain operations with its storage 404 and another storage device, such as USB drive 406.

The driver 412 may be provided to the second device 116 from the PDL 114 by the binding application 214. For example, upon start up or being connected to the second device 116, the PDL 114 may automatically install the driver 412 in to the second device 116. Alternatively, the second device 116 may obtain the driver 412 from another location or device, such as external authority 108 or a server connected to network 106 (not shown in FIG. 4B). For example, upon being connected to the PDL 114, the second device 116 may be redirected with or without user interaction to external authority 108 or a website to obtain the driver 412.

As also shown, the driver 412 may implement a set of policies or business rules. Such policies or business rules may be specified in the policy file 410. As noted, the policy file may be provided to the second device 116 from the PDL 114 by the binding application 214. Alternatively, the second device 116 may obtain the policy file 410 from another location or device, such as external authority 108 or a server connected to network 106 (not shown in FIG. 4B).

Referring now to FIG. 4C, the second device 116 may be restricted in accessing the file 212 on the PDL 114 based on an operating system component or other form of program code that monitors the operations or commands related to the file 212. As shown, the O/S 400 of the second device 116 has been modified with a filter 414. The filter 414, for example, may be a kernel level exception or filter that has been installed on the second device 116 by the PDL 114. The filter 414 may also be implemented as firewall software or a firewall policy running on the second device 116. The filter 414 may intercept various cut, copy, read, write commands as well as various disk commands and evaluate them relative to the business rules or policies specified in the policy file 410. For example, as shown in FIG. 4C, the filter 414 may continuously monitor operations and commands requested on the second device 116 and may restrict operations related to writing files to its storage 404 and another storage device, such as USB drive 406. The filter 414 may also implement other types of security features to protect the binding of the file 212 to the PDL 114. Such security features may include, among other things, monitoring outgoing connection attempts; restricting control and access to a local network and/or Internet; restricting responses to incoming network traffic received by the second device 116; monitor applications that are listening for incoming connections; restrict the user when client application 402 makes a connection attempt to a network or another device; and the like. In some embodiments, the filter 414 is configured to be self-expiring or self-deleting in order to avoid leaving remnants of itself on the computer. In addition, the filter 414 may comprise various audit or logging functions to record the transactions attempted or conducted with the PDL 114. In some embodiments, the filter 414 may also be configured to provide its audit and logging information to another entity, such as external authority 108, for analysis and monitoring. The filter 414 may provide such information on a periodic basis or upon the occurrence of various events, such as a security breach or request for the information.

The filter 414 may be provided to the second device 116 from the PDL 114 by the binding application 214. For example, upon start up or being connected to the second device 116, the PDL 114 may automatically install the filter 414 in to the second device 116. Alternatively, the second device 116 may obtain the filter 414 from another location or device, such as external authority 108 or a server connected to network 106 (not shown in FIG. 4C).

In some embodiments, the filter 414 may also be implemented using existing security software installed on the second device 116, such as a firewall or antivirus application. In these embodiments, the binding of the file 212 is thus protected using the existing services of such security software. In other embodiments, the filter 414 may be implemented as an access control list or other form of file system configuration that restricts the read, write, and modify permissions that can be performed for the file 212 or on the PDL 114.

As shown, the filter 414 may implement a set of policies or business rules. Such policies or business rules are specified in the policy file 410. As noted, the policy file may be provided to the second device 116 from the PDL 114 by the binding application 214. Alternatively, the second device 116 may obtain the policy file 410 from another location or device, such as external authority 108 or a server connected to network 106 (not shown in FIG. 4C).

Figure 5A:
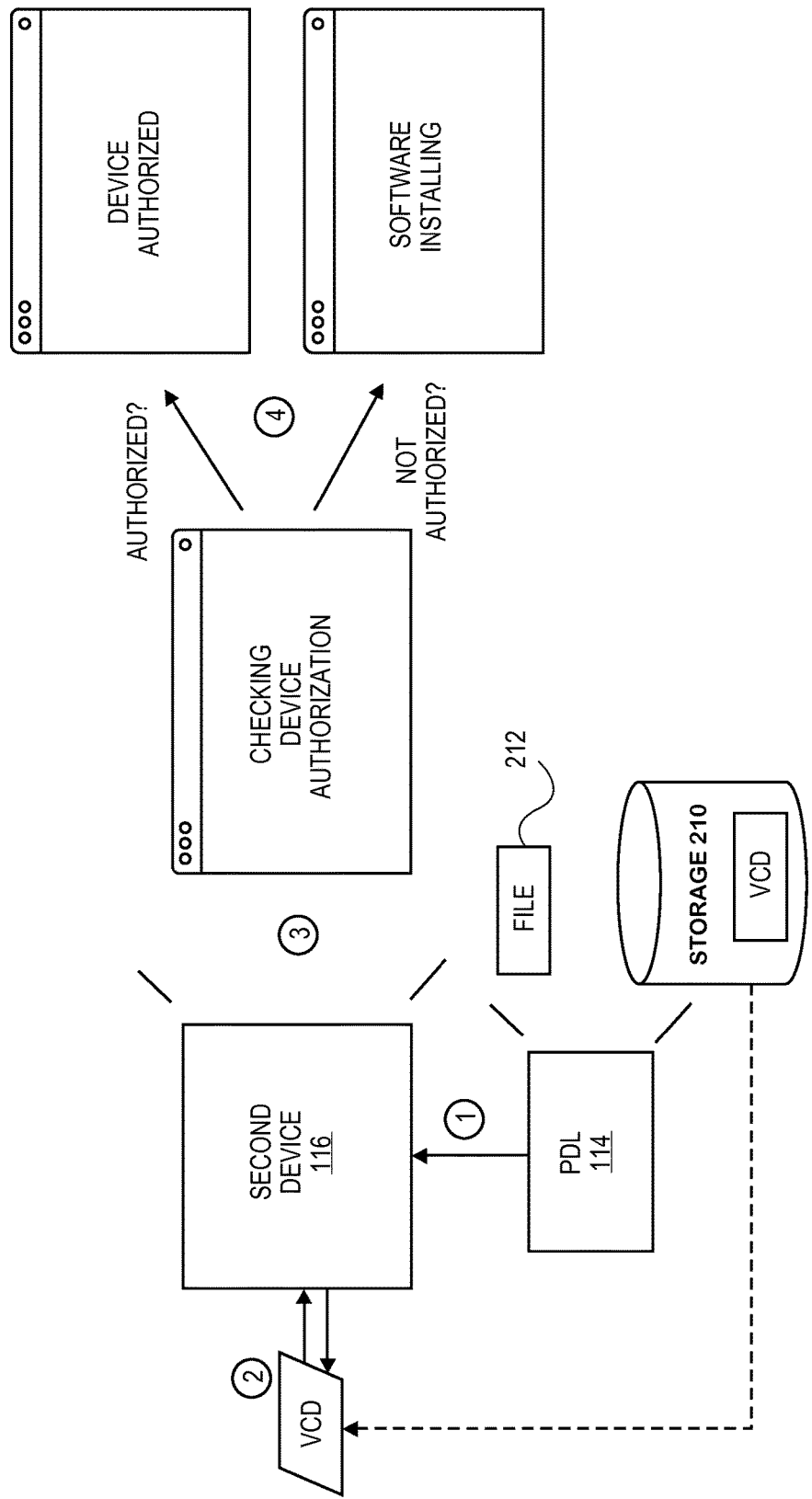
FIGS. 5A-5B illustrate a computing device accessing a file bound to a personal data locker in accordance with embodiments of the present disclosure.
Figure 5B:
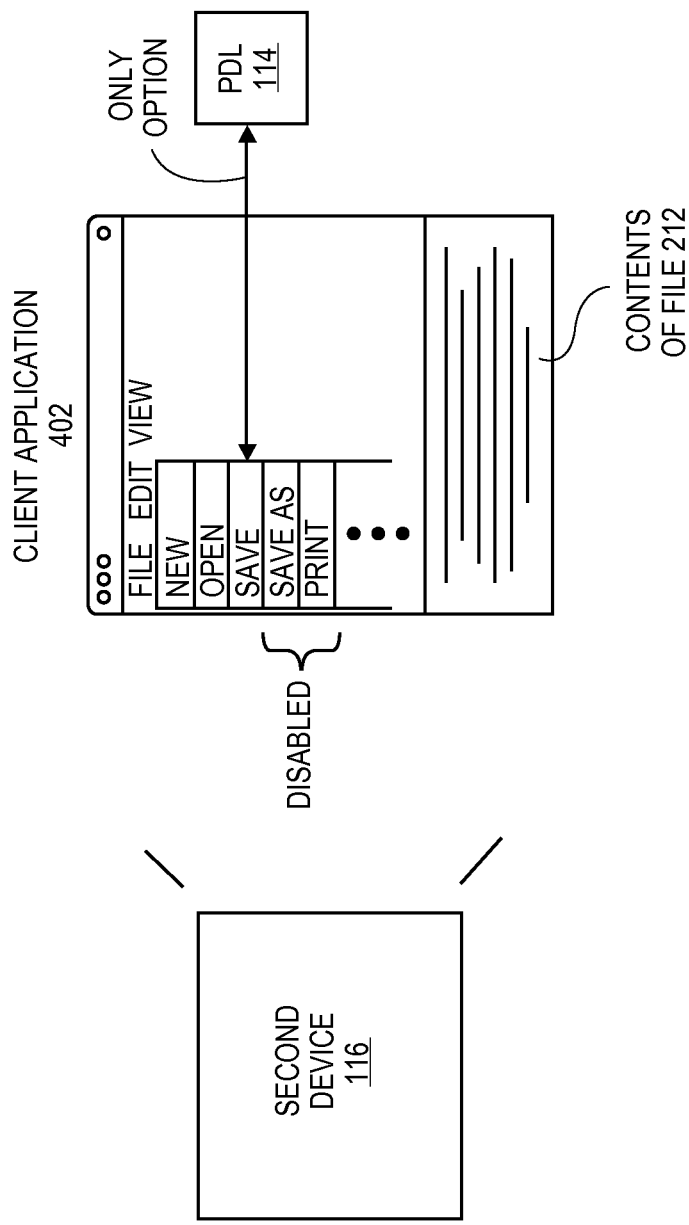

FIGS. 5A-5B illustrate the second device 116 accessing the file 212 that has been bound to the PDL 114. As shown, the PDL 114 is coupled to the second device 116, for example, via a USB or Fire Wire connection. For example, within the PDL 114, the control processor 200 (not shown in FIG. 5A) detects a new connection at input/output module 202. In response, second, the PDL 114 may mount and open itself onto the second device 116 as a partition or drive that is interpreted as a read-only device, such as a CD-ROM drive. For example, as noted, the PDL 114 may implement a virtual CD (VCD) within its storage 210. The second device 116 may then perform an auto-play or auto-run operation to allow program code from the PDL 114 to execute.

Thus, third, the binding application 214 may commence an authentication, integrity, and authorization check of the second device 116. The binding application 214 may install itself automatically in to the second device 116 or execute from the PDL 114 based on a root kit, and the like. In some embodiments, these operations may be performed transparently to the user, while in other embodiments, user interaction may be required or requested. For example, the binding application 214 may cause a message, such as "Checking Device Authorization," to be displayed on the second device 116 while these checks are being performed.

Fourth, depending on whether the device 116 is authorized, the binding application 214 may allow access to the file 212. For example, the binding application 214 may cause a message, such as "Device Authorized", to be displayed on the second device 116. Alternatively, if the device 116 is not authorized or configured in such a way that jeopardizes the security of the file 212, the binding application 214 may install program code or other software on to the second device 116. For example, as noted above, the binding application 214 may install an application, an application extension, or application plug-in on to the second device 116. The binding application 214 may also implement various file system level changes in the second device 116. For example, the binding application 214 may specify various file system permissions at the drive level, volume level, directory level, and/or file level.

In some embodiments, the binding application 214 may perform various checks in order to determine what type of software or program code to install. For example, the binding application 214 may identify the processor, chipset, operating system, and the presence of one or more applications as conditions for installing its program code. The binding application 214 may thus modify or select which program code to install based on this information. Furthermore, the binding application 214 may be configured to maintain certain parameters while modifying a file bound to the PDL 114. For example, the user or computer may be required to maintain membership of an authorized domain or to maintain communications with a network or the external authority 108.

In some embodiments, the binding application 214 may be configured to follow a policy or set of rules when installing its program code. For example, the binding application 214 may be allowed to install program code on Windows operating computers, but restricted or prohibited from installing program code on Unix or Linux devices. The binding application 214 may also, at this time, check for any updates regarding the security of the file 212. For example, the binding application 214 may request various network communications via the second device 116 with the trusted domain 102 or the external authority 108. The binding application 214 may thus determine whether access to the file 212 has been changed, revoked, or expired. Of course, during the process of installing its program code, the binding application 214 may cause the display of a message, such as "Software Installing", on the second device 116.

Referring now to FIG. 5B, the second device 116 is shown executing an application 402 that has been modified with a plug-in installed from the PDL 114. In the example shown, the client application 402 has been restricted from allowing the user to use the "save as" and "print" items of its typical "File" menu. In addition, the client application 402 may only "save" to the PDL 114 as a storage location.

In addition, the plug-in may modify or restrict other features of the client application 402. For example, the client application 402 may have various restrictions placed on its "copy", "paste", "send to", and "rename" functions. The second device 116 may also be modified to prohibit operations to other storage locations, such as its local hard drive, optical drive, or USB interface. The second device 116 may also have its network communications and/or browser applications restricted in various manners while the file 212 is opened by the client application 402. A wide variety of restrictions to protect the file 212 while stored on the PDL 114 may be implemented in the embodiments.

Figure 6A:
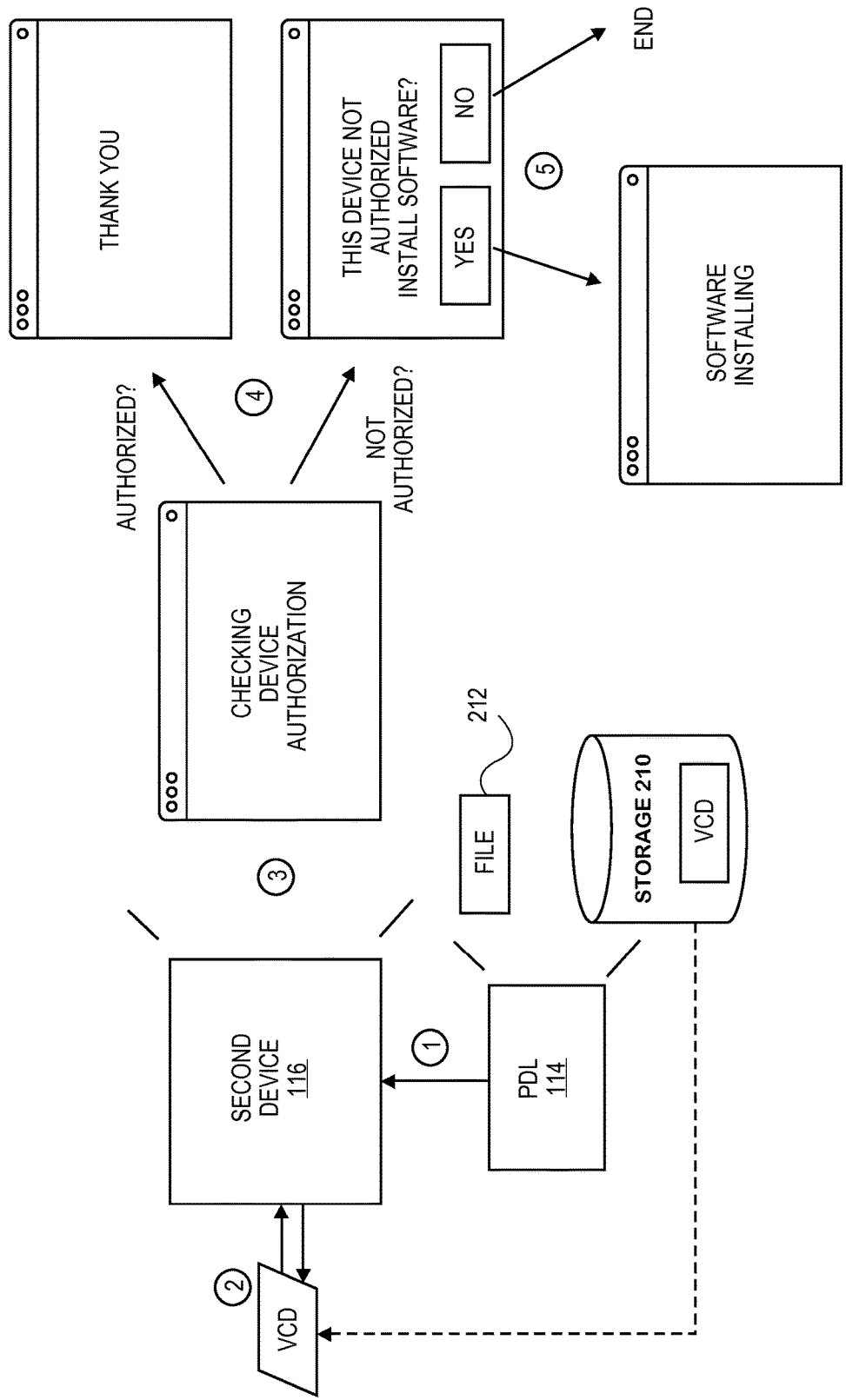
FIGS. 6A-6B illustrate another example of a computing device accessing a file bound to a personal data locker in accordance with embodiments of the present disclosure.
Figure 6B:
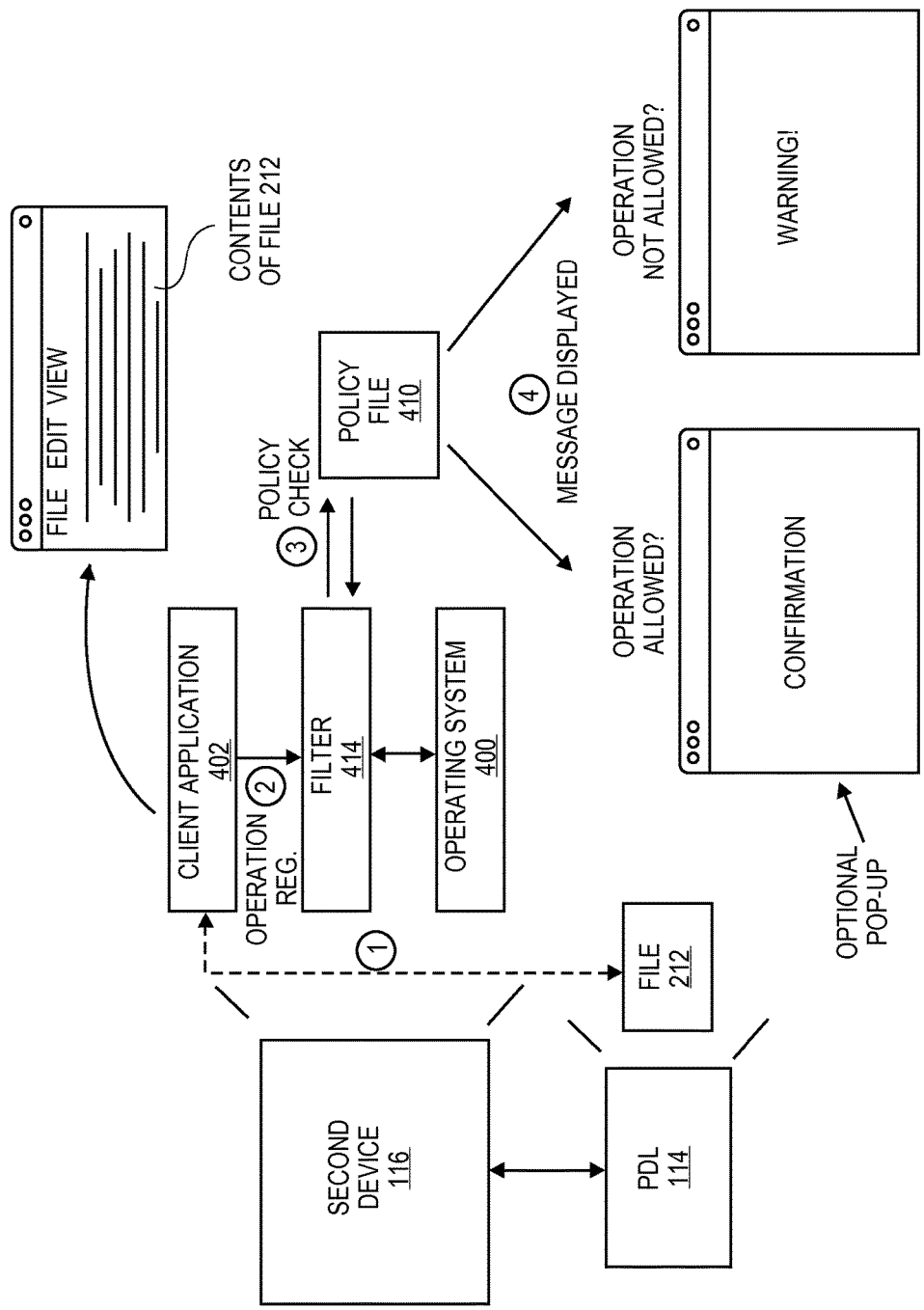

FIGS. 6A-6B illustrate another example of the second device 116 accessing the file 212 bound to the PDL 114. In particular, FIGS. 6A and 6B illustrate a less intrusive or more transparent way of restricting the access of the second device 116 to the file 212. For example, the PDL 114 may control access to the file 212 utilizing operating system level features. In some embodiments, the PDL 116 cooperates with the operating system 400 of the second device 116 to implement a kernel-level filter that intercepts various read and write commands requested by the client application 402. Alternatively, the PDL 114 may utilize existing security features of the operating system 400. For example, the PDL 114 may utilize various features of Microsoft Windows' bitlocker or Apple Mac OSX's filevault features to secure itself when coupled to the second device 116.

As shown, the PDL 114 may be coupled to the second device 116, for example, via a USB or Fire Wire connection. For example, within the PDL 114, the control processor 200 detects a new connection at input/output module 202. In response, second, the PDL 114 may mount and open itself onto the second device 116 as a partition or drive that is interpreted as a read-only device, such as a CD-ROM drive. As noted, the PDL 114 may implement a virtual CD (VCD) within its storage 210. The second device 116 may then perform an auto-play or auto-run operation to allow program code from the PDL 114 to execute.

Thus, third, the binding application 214 may commence an authentication, integrity, and authorization check of the second device 116. The binding application 214 may install itself automatically in to the second device 116 or execute from the PDL 114 based on a root kit, and the like. In some embodiments, these operations may be performed transparently to the user, while in other embodiments, user interaction may be required or requested. For example, the binding application 214 may cause a message, such as "Checking Device Authorization," to be displayed on the second device 116 while these checks are being performed.

Fourth, depending on whether the device 116 is authorized, the binding application 214 may allow access to the file 212. For example, the binding application 214 may cause a message, such as "Thank You", to be displayed on the second device 116.

Alternatively, if the device 116 is not authorized or configured in such a way that jeopardizes the security of the file 212, the binding application 214 may install program code or other software on to the second device 116. In these instances, the binding application 214 may optionally display a message on the second device 116, such as "This Device is Not Authorized" or "Please Install Software to Authorize this Device." Such a message may be displayed because the program code from the binding application 214 may affect various aspects of the operating system 400 running on the second device 116. In other embodiments, the binding application 214 may attempt to install its program code based on administrative privileges, such as using a root kit.

The binding application 214 may implement various file system permissions or access control lists. The binding application 214 may also install a kernel level filter within the operating system 400. This filter, such as filter 414, may be configured to intercept commands, such as read/write, cut/copy. In addition, the filter 414 may evaluate and, if needed, restrict disk I/O operations, network communications, and other I/O operations, such as USB operations. The binding application 214 may also implement various file system level changes in the second device 116. For example, the binding application 214 may specify various file system permissions at the drive level, volume level, directory level, and/or file level. Furthermore, as noted, the binding application 214 may cooperate with various security utilities provided by the operating system 400 of the second device 116, such as bitlocker for Windows devices and filevault for Mac devices. Accordingly, the binding application 214 may leverage various services of these security utilities, such as encryption services, policy enforcement, etc. to restrict the access to the file 212.

In some embodiments, the binding application 214 may perform various checks in order to determine what type of software or program code to install. For example, the binding application 214 may identify the processor, chipset, operating system, and the presence of one or more applications as conditions for installing its program code. The binding application 214 may thus modify or select which program code to install based on this information.

In some embodiments, the binding application 214 may be configured to follow a policy or set of rules when installing its program code. For example, the binding application 214 may be allowed to install program code on Windows operating computers, but restricted or prohibited from installing program code on Unix or Linux devices. The binding application 214 may also, at this time, check for any updates regarding the security of the file 212. For example, the binding application 214 may request various network communications via the second device 116 with the trusted domain 102 or the external authority 108. The binding application 214 may thus determine whether access to the file 212 has been changed, revoked, or expired. Of course, during the process of installing its program code, the binding application 214 may cause the display of a message, such as "Software Installing", on the second device 116.

Referring now to FIG. 6B, the second device 116 is shown executing an application 402. In the example shown, the client application 402 has not been directly modified. Instead, operations by the client application 402, have been restricted to prevent the user from using operations like the "save as" and "print" items of its typical "File" menu. Such operations are ultimately evaluated as requests to the operating system 400, which are then checked by the filter 414. In some embodiments, the filter 414 may refer to a policy file 410 that contains the rules or policies assigned to the file 212.

In addition to various operations by the client application 402, the second device 116 may also restricted by the filter 414 with operations to other storage locations, such as its local hard drive, optical drive, or USB interface. The second device 116 may also have its network communications and/or browser applications restricted in various manners while the file 212 is opened by the client application 402. A wide variety of restrictions to protect the file 212 while stored on the PDL 114 may be implemented in the embodiments.

Other embodiments will be apparent to those skilled in the art from consideration of the specification and practice of the embodiment disclosed herein. For example, the PDL may wrap its secured files and require the execution of a special purpose application or viewer. Thus, these files may only be accessed upon the launching of a specific underlying application that has been installed from the PDL or executed from the PDL. It is intended that the specification and examples be considered as exemplary only, with a true scope and spirit of the embodiment being indicated by the following claims.

What is claimed is:

1. A method comprising:
saving a file to a data storage device coupled to a computer network to thereby obtain a saved file;
generating a fingerprint of the data storage device based on a drive defect signature of a storage medium of the data storage device;
binding, using the fingerprint, the saved file to the data storage device to restrict access to the saved file to thereby obtain a bound file;
obtaining at least a policy from an external authority coupled to the computer network, the policy being configured to selectively restrict access to and use of the bound file;
determining that the data storage device has been accessed by a computing device;
determining that program code was not previously installed on the computing device, the program code being configured to at least restrict access by the computing device to the bound file according to the policy;
in response to determining that the program code was not previously installed on the computing device, installing the program code on the computing device;
causing the computing device to execute the program code; and
restricting access, by the computing device executing the program code, to the bound file according to the policy.

2. The method of claim 1, wherein restricting access includes restricting at least one of opening the bound file, editing the bound file, saving the bound file, moving the bound file, or deleting the bound file.

3. The method of claim 1, further comprising determining whether the program code was previously installed on the computing device in response to determining that the data storage device has been accessed by the computing device.

4. The method of claim 1, wherein the data storage device is a network attached storage (NAS) data storage device.

5. The method of claim 1, wherein the policy is date-restricted.

6. The method of claim 1, further comprising revoking or modifying the policy based upon predetermined criteria.

7. A data storage device comprising:
a non-transitory storage medium for storing at least one file;
program code stored on the non-transitory storage medium, the program code being configured to restrict access to the at least one file;
a communication interface configured to couple to a computer network; and
a processor configured by instructions to:
save the at least one file to the non-transitory storage medium;
generate a fingerprint based on a drive defect signature of the non-transitory storage medium;
bind, using the fingerprint, the at least one file to the data storage device to selectively restrict access thereto to thereby obtain a bound at least one file;
obtain, over the communication interface, a policy from an external authority coupled to the computer network, the policy being configured to selectively restrict access to and use of the bound at least one file;
determine that the data storage device has been accessed by a computing device over the communication interface;
determine that the program code was not previously installed on the computing device; and cause the program code to install on the computing device in response to determining that the program code was not previously installed on the computing device;

wherein the program code is further configured to execute on the computing device and to restrict access by the computing device to the at least one file bound to the data storage device according to the policy.

8. The data storage device of claim 7, wherein the program code is configured to restrict at least one of:
opening the bound at least one file;
editing the bound at least one file;
saving the bound at least one file;
moving the bound at least one file; or
deleting the bound at least one file.

9. The data storage device of claim 7, wherein the communication interface comprises at least one of a wired or a wireless communications interface.

10. The data storage device of claim 7, wherein the processor and the non-transitory storage medium form part of a network attached storage (NAS) data storage device.

11. The data storage device of claim 7, wherein the policy is date-restricted.

12. The data storage device of claim 7, wherein the policy is configured to be selectively one of revoked or modified, based upon predetermined criteria.

13. A method comprising:
generating a fingerprint of a data storage device based on a drive defect signature of a storage medium of the data storage device;
saving and binding a file to the data storage device coupled to a computer network to thereby obtain a bound file;
determining that the data storage device has been accessed by a computing device;
obtaining at least a policy from an external authority coupled to the computer network, the policy being configured to selectively restrict access to and use of the bound file;
determining that program code was not previously installed on the computing device, the program code being configured to enable restricting access to and use of the bound file according to the policy;
installing the program code on the computing device in response to determining that the program code was not previously installed on the computing device;
causing the computing device to execute the program code; and
restricting access to and use of the bound file by the computing device executing the program code, according to the policy.

14. The method of claim 13, further comprising obtaining the program code from one of the external authority or another location coupled to the computer network.

15. The method of claim 13, further comprising accessing the external authority over the computer network for authentication and authorization information related to at least one of access to or use of the bound file.

16. The method of claim 13, further comprising accessing the external authority over the computer network to obtain therefrom updates to the policy and the program code.

17. The method of claim 13, further comprising logging accesses and uses of the bound file by the computing device executing the program code.

18. The method of claim 13, further comprising obtaining an encryption key from the external authority over the computer network, wherein the bound file is encrypted.

19. A data storage device comprising:
a non-transitory storage medium configured to store a file;
program code stored on the non-transitory storage medium, the stored program code being configured to restrict access to the stored file;
a communication interface; and
a processor configured by instructions to:
generate a fingerprint based on a drive defect signature of the non-transitory storage medium;
save and bind the file, using the fingerprint, to the data storage device to thereby obtain a bound file;
determine that the data storage device has been accessed by a computing device over the communication interface;
obtain at least a policy from an external authority coupled to a computer network, the policy being configured to selectively restrict access to and use of the bound file by the computing device;
determine that the program code was not previously installed on the computing device; and
install program code on the computing device in response to determining that the program code was not previously installed on the computing device, the program code being configured to enable restricting of access to and use of the bound file according to the policy;
wherein the program code is further configured to execute on the computing device and to restrict access, according to the policy, by the computing device to the file bound to the data storage device.

20. The data storage device of claim 19, wherein the processor is further configured to obtain the program code from one of the external authority or another location coupled to the computer network.

21. The data storage device of claim 19, wherein the policy is configured to require access to the external authority over the computer network for authentication and authorization information related to at least one of access to or use of the bound file.

22. The data storage device of claim 19, wherein the processor is further configured to access the external authority over the computer network to obtain therefrom updates to the policy and the program code.

23. The data storage device of claim 19, wherein the program code is further configured to log accesses and uses of the bound file.

24. The data storage device of claim 19, wherein the bound file is encrypted, and the processor is further configured to obtain an encryption key from the external authority over the computer network.

* * * * *